United States Patent [19]
Groenendyke

[11] 3,718,204
[45] Feb. 27, 1973

[54] DISPLAY OF BOREHOLE WALL CONFIGURATION

[75] Inventor: Goethe M. Groenendyke, Dallas, Tex.

[73] Assignee: Mobil Oil Coropration, New York, N.Y.

[22] Filed: Jan. 18, 1971

[21] Appl. No.: 107,384

[52] U.S. Cl. .................... 181/.5 BE, 340/15.5 DS
[51] Int. Cl. .............................................. G01v 1/36
[58] Field of Search ..181/5 BE; 340/15.5 A, 15.5 DS

[56] References Cited

UNITED STATES PATENTS

3,369,626  2/1968  Zemanek ........................ 181/.5 BE

*Primary Examiner*—Samuel Feinberg
*Assistant Examiner*—J. V. Doramus
*Attorney*—William J. Scherback, Frederick E. Dumoulin, Andrew L. Gaboriault and Sidney A. Johnson

[57] ABSTRACT

The specification discloses a borehole tool having a directional acoustic transducer which is rotated while logging and operated periodically to transmit acoustic pulses to the borehole wall and to detect reflected acoustic energy. Reflection signals are employed to produce an analog voltage having amplitude variations which are dependent upon the pulse travel time or distance between the transducer and the borehole wall. The analog voltage, in one embodiment, is combined with a sawtooth wave beam sweep of an oscilloscope and applied to one of the deflection plates to move a spot across the screen at a rate which varies as a function of distance between the transducer and the wall of the borehole. The electron beam is turned ON periodically at equally spaced time intervals during each beam sweep to produce trace patterns which are recorded in side-by-side relationship. Spots at the same time intervals across the trace patterns form clearly defined caliper traces having excursions indicative of the size of the borehole at different depths.

24 Claims, 32 Drawing Figures

GOETHE M. GROENENDYKE
INVENTOR

BY George W. Hagerich
ATTORNEY

GOETHE M. GROENENDYKE
INVENTOR

BY George W. Hoger Jr
ATTORNEY

GOETHE M. GROENENDYKE
INVENTOR

BY George W. Hager Jr.
ATTORNEY

GOETHE M. GROENENDYKE
INVENTOR

BY George W Hager Jr
ATTORNEY

GOETHE M. GROENENDYKE
INVENTOR

BY Arthur F. Zobal
ATTORNEY

DISPLAY OF BOREHOLE WALL CONFIGURATION

BACKGROUND OF THE INVENTION

This invention relates to the production of a display of the configuration of the wall of a borehole.

In U.S. Pat. No. 3,369,626, there is disclosed an acoustic borehole logging technique and system wherein the walls of a bore hole are scanned periodically with acoustic energy for obtaining information of interest. In one embodiment, a single transducer which acts both as a transmitter and receiver is rotated in the borehole and periodically actuated to produce acoustic pulses which are applied to the borehole wall. Reflected energy is detected by the transducer between acoustic pulses and converted into reflection signals. A beam sweep is produced once for each transducer rotational signal and applied to the horizontal deflection plates of an oscilloscope to sweep an electron beam along a path horizontally across the screen of the scope. The reflection signals are employed to intensity modulate the electron beam of the oscilloscope as the beam is swept across the screen of the scope. In one embodiment, a sawtooth waveform is produced during each transducer operating period and which encompasses the expected arrival of the reflection signal. Each of these sawtooth waveforms is applied to both deflection plates of the scope to deflect the beam vertically from its otherwise horizontal path. The reflected energy is detected at a time which is a function of the time or distance between the transducer and the wall of the borehole. Thus, the reflection signals will intensify the electron beam during different time periods of each sawtooth waveform and hence at different vertically displaced positions. Hence, a horizontal trace is produced across the screen which has vertical excursions or deviations which are a function of the time or distance between the transducer and the wall of the borehole.

In U.S. Pat. No. 3,550,075 to Douglas W. Hilchie et al., there is disclosed and claimed a technique and system which converts the reflection signals to pulses having heights which are a function of the time or distance between the transducer and the borehole wall. These pulses are employed to intensify the electron beam as it is swept across the screen during each downhole cycle. A resulting trace pattern is formed which varies in intensity or tones as a function of the time or distance between the transducer and the borehole wall.

In the above-mentioned patent and patent application, the trace patterns obtained may be recorded in side-by-side relationship to form a display which gives information about the configuration of the borehole wall.

SUMMARY OF THE INVENTION

In accordance with the present invention, there is provided a different and unique technique and system for obtaining a display of the configuration of the wall of an aperture and which is very useful for interpretation purposes.

In one aspect there is provided a method of and system for presenting data on a display medium, the data being obtained from cyclic scanning operations carried out, with scanning means, angularly around the wall of an aperture at a plurality of points and at each of a plurality of different positions in a direction along the axis of the aperture to obtain information about the configuration of the wall of the aperture. In carrying out the method, a visible spot is displayed and moved to different positions along a predetermined path on the display medium once for each borehole scanning cycle. The rate at which the spot is moved to the positions along the path is varied as a function of the distance between the scanning means and the wall of the aperture at each scanning point to produce a trace pattern of interest on the display medium for each scanning cycle.

In one embodiment, the spot is periodically displayed only at equally spaced time intervals along the path. A plurality of the resulting trace patterns produced are recorded in side-by-side relationship whereby spots at the same time intervals across the trace patterns form traces having excursions indicative of variations of the size of the aperture at different positions in a direction along its axis.

In another embodiment, the spot is displayed continuously as it is moved along the path to produce a continuous trace pattern on the display medium for each scanning cycle. The spot may be periodically intensified at equally spaced time intervals along the path whereby intensified spots at the same time intervals across the trace patterns when recorded in side-by-side relationship form traces having excursions indicative of variations of the size of the aperture at the different positions.

In a more detailed aspect, the method and system are specifically directed to the presentation and recording of data obtained from well logging operations wherein an energy transmitting and receiving means is rotated cyclically in a bore hole and operated periodically during each cycle to transmit energy pulses to the borehole wall and to detect energy reflected from the borehole wall, and reflection signals are produced in response to reflected energy detected. The data is displayed on a display medium of a display system having an electron beam producing means and two deflection means for producing electron beam deflection fields.

In carrying out the method of the invention, a sawtooth wave beam sweep is produced once for each borehole scanning cycle. The electron beam producing means is controlled to produce an electron beam at least at a plurality of equally spaced time intervals during each beam sweep to form a spot on the display medium at least at a plurality of equally spaced time intervals. The beam sweep is applied to one of the deflection means for moving the spot across the display medium during each beam sweep. The reflection signals are employed to produce an output which is a function of the distance between the transmitting and receiving means and the wall of the borehole as the transmitting and receiving means is rotated. This output is applied to vary the deflection field of one of the deflection means to produce a trace pattern with the spot which reflects information about the configuration of the wall of the borehole.

In another embodiment, the reflection signals are employed to produce a function having an amplitude representative of the distance between the transmitting and receiving means and the wall of the borehole as the transmitting and receiving means is rotated. A resultant function is produced by removing low frequency components from the function to remove slow changes in amplitude due to slow changes in the distance between the transmitting and receiving means and the wall of the borehole as sensed by the transmitting and receiving means as it is rotated. The resultant function is employed to produce a trace pattern on the display medium for each beam sweep which reflects information about the configuration of the wall of the borehole.

In a further embodiment, the reflection signals are employed to sample the resultant function at times corresponding to the reception of reflected energy for the production of output pulses at these times. These output pulses are applied to the electron beam producing means to control the intensity of the electron beam produced.

BRIEF DESCRIPTION OF THE DRAWINGS

FIGS. 2A-2K are traces useful in understanding the present invention;

FIGS. 10A-10C are traces useful in understanding the circuitry of FIG. 9;

DESCRIPTION OF THE BOREHOLE SYSTEM

Figures 1, 3:
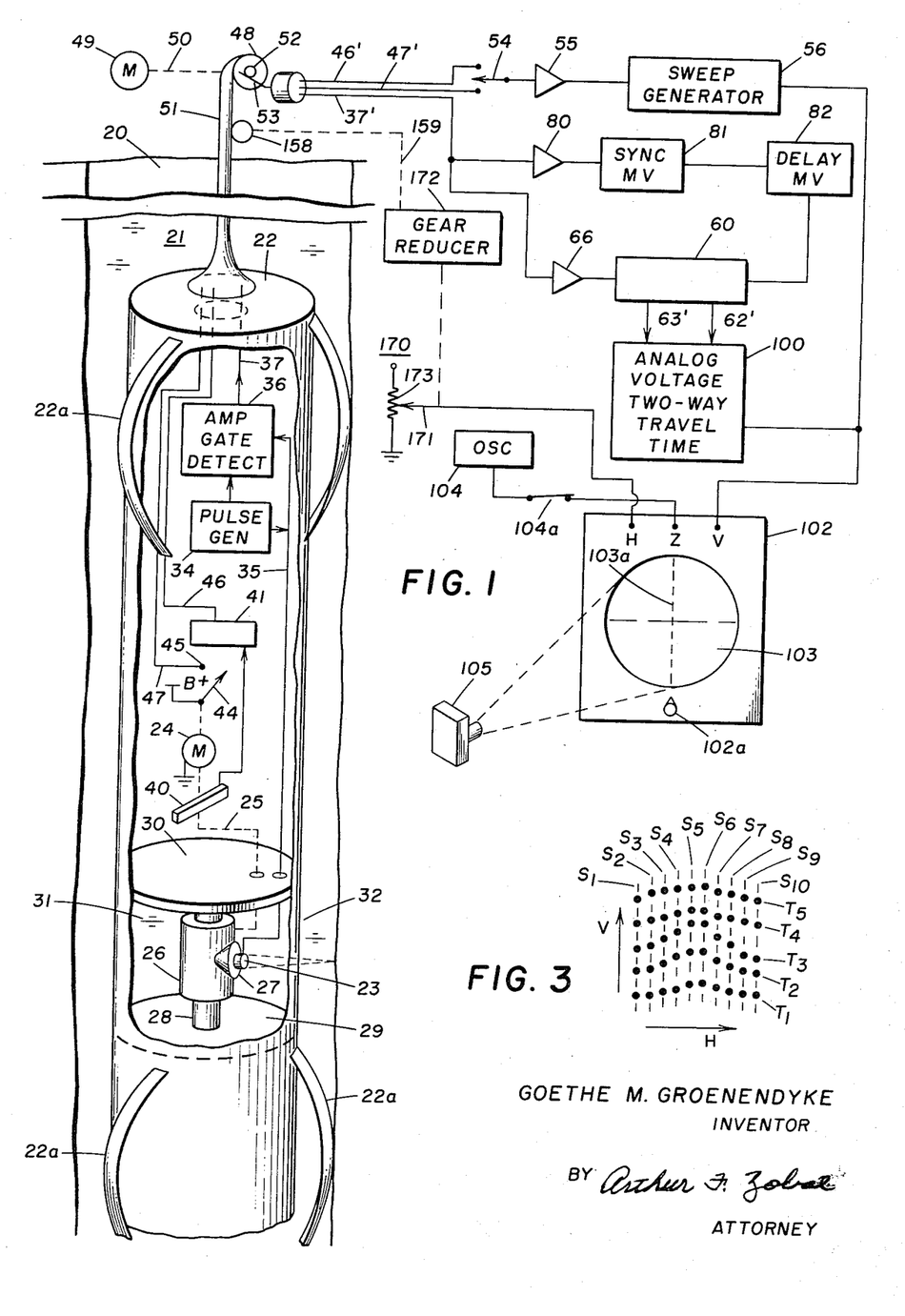
FIG. 1 illustrates one embodiment of the present invention employed in combination with an acoustic well logging system.
FIG. 3 illustrates the manner in which a display may be obtained with the system of FIG. 1.

Referring now to FIG. 1, there will be described briefly a borehole system employed for carrying out logging operations in a borehole illustrated at 20 and containing borehole fluid 21. The borehole logging system comprises a borehole tool 22 having located therein an acoustic transducer 23 which acts as a transmitter and receiver of acoustic energy. Centralizers 22a are employed to maintain the tool centered in the borehole while logging. During logging operations, the transducer 23 is rotated through 360° by motor 24, mechanical drive 25 (illustrated in detail in U.S. Pat. No. 3,378,097), sleeve 26, and transducer mount 27. The sleeve 26 rotates about mandrel 28 which connects end member 29 to structure 30. In one embodiment, the transducer is rotated at a rate of about 180 revolutions per minute. During each 360° cycle, the transducer 23 is pulsed periodically, in one embodiment, at a rate of about 2,000 pulses per second for the application of acoustic pulses to the borehole wall by way of tool fluid 31, rubber boot 32, and the borehole fluid 21. The predominant frequency of the acoustic pulses may be of the order of 1.35 megacycles. Pulse generator 34 which is coupled to transducer 23 by way of conductor 35 and slip rings (not shown) periodically actuates the transducer for the production of acoustic pulses. Between transmitted acoustic pulses, reflected energy is detected by the transducer 23 and applied to the surface by way of conductor 35; amplifier, gate, and detector system 36; and cable conductor 37. Sync pulses are obtained from the transducer 23, when it is actuated, and also are applied to conductor 37 for transmission to the surface.

Figure 2:
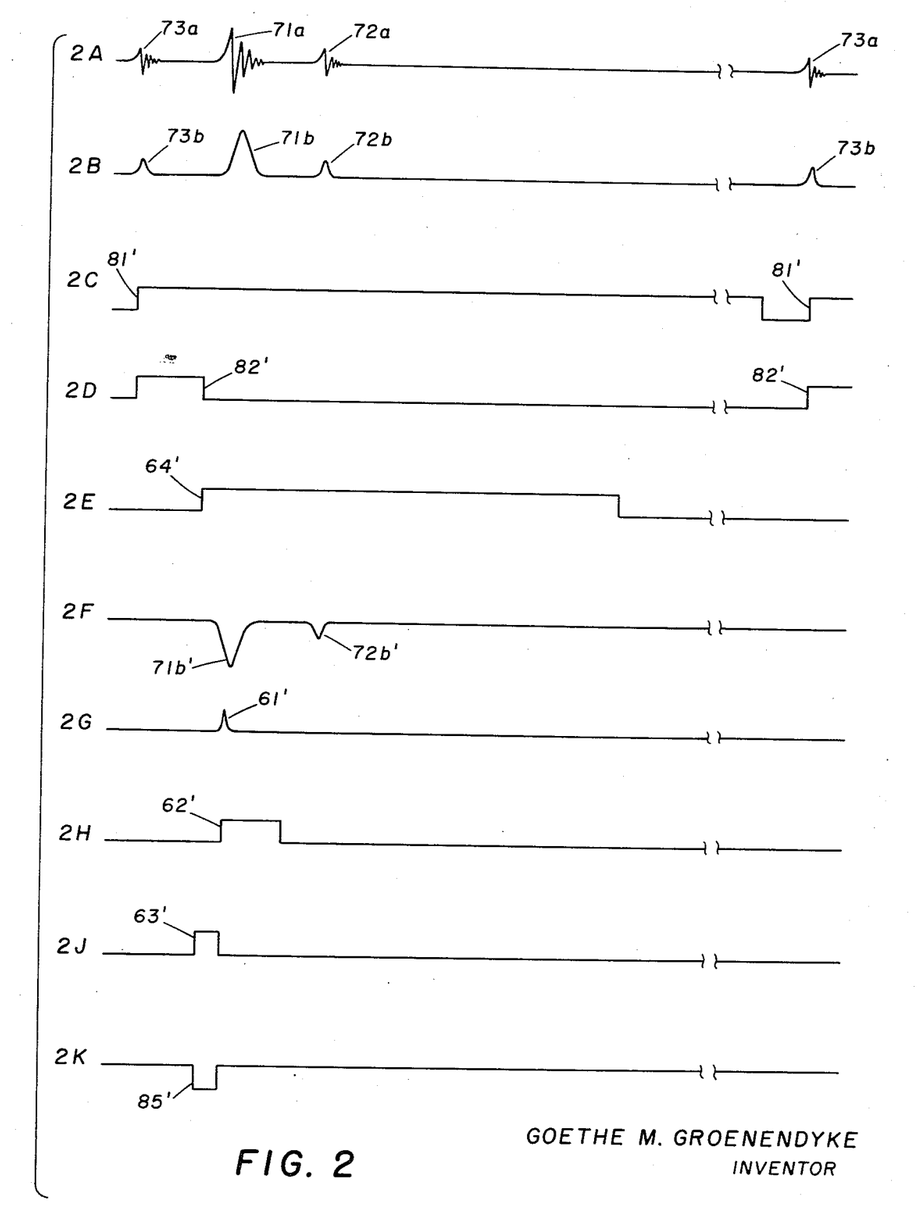

Referring to FIGS. 2A and 2B, a primary reflection from the borehole wall is illustrated by signal 71a. The signal 72a is due to reverberation. The pulse shown at 73a represents a portion of output produced by the transducer 23 when it is actuated and which is employed as a sync pulse. The downhole circuitry illustrated in block diagram 36, in FIG. 1, detects the resulting signals to form from signals 71a, 72a, and 73a, the envelope signals 71b, 72b, and 73b, respectively, for transmission to the surface by way of conductor 37.

Coupled to mechanical drive 25 for rotation therewith is a magnetic north sensing means 40 which in turn is coupled to circuitry 41 which produces an orienting signal each time the transducer 23 passes magnetic north. Also coupled to the mechanical drive 25 for rotation therewith is an arm 44 which cyclically contacts terminal 45 of a rotating switching system. A suitable rotating switch is described in U.S. Pat. No. 3,518,679. A cyclic pulse is produced each time the arm 44 contacts terminal 45. A downhole switching system controlled from the surface is employed to transmit either the orienting signals or the cyclic pulses uphole. For ease of illustration, the switching system is shown as located uphole and separate cable conductors are disclosed for transmitting the orienting signals and the cyclic pulses to the surface. These cable conductors are illustrated at 46 and 47, respectively.

During logging operations, drum 48, driven by motor 49 and connection 50, winds and unwinds the supporting cable 51 to move the tool 22 through the borehole. At the surface, the various pulses and signals are taken from the cable conductors by way of slip rings and brushes illustrated, respectively, at 52 and 53.

An uphole switch 54 is employed to select either the orienting pulses or the cyclic pulses from conductors 46' or 47', respectively. The signals or pulses selected then are amplified at 55 and applied to sweep generator 56 which generates a sawtooth waveform for each rotation of the transducer 23. For open-hole logging, the orienting pulses are selected, while the cyclic pulses from the rotating switch are selected if casing inspection is being carried out.

At the surface the reflection signals and sync pulses are applied to conductor 37'. Circuitry illustrated at 60 in FIG. 1 converts the primary reflection signals 71b (FIG. 2B) into pulses of the same width and height. These pulses are illustrated at 62' in FIG. 2H. The time of occurrence of a reflection signal 71b and of pulse 62' relative to the sync pulse is a function of the time or distance between the transducer and the wall of the borehole.

The circuitry 60 blocks subsequent reverberation signals and also produces a pulse 63', the latter of which is illustrated in FIG. 2J. Pulse 63' begins at a fixed time following each sync pulse and ends at the beginning of pulse 62'. Hence, the width of pulse 63' is a function of the time or distance between the transducer and the wall of the borehole.

The circuitry 60 is described in detail in copending U.S. Pat. No. 3,553,640 to Joseph Zemanek, Jr.

DETAILED DESCRIPTION OF THE INVENTION

The pulses 62' and 63' are applied to circuitry 100 which produces an analog voltage having an amplitude representative of the two-way travel time between the transducer and the wall of the borehole as the downhole transducer 23 is rotated.

The output of circuit 100 is combined with the sawtooth waveform produced from sweep generator 56 and applied to the vertical deflection plates of an oscilloscope 102. The sawtooth waveform from generator 56 thus sweeps the electron beam, when ON, vertically across the screen 103 of the scope once for each downhole rotation of the transducer 23. The output of the circuit 100 varies the rate at which the beam is swept or moved along its path as a function of the time or distance between the transducer and the borehole wall. A free-running oscillator 104, synchronized by the sawtooth waveforms from the generator 56, is coupled to the Z-axis of the oscilloscope 102. The output of the oscillator 104 controls the cathode, for example, of the scope 102 to turn the electron beam ON to a level sufficient to produce a spot on the screen for each output pulse of the oscillator. In one embodiment, the oscillator 104 operates to periodically produce pulses at equally spaced time intervals at a repetition rate of 180 pulses per second. Since the downhole transducer is rotated at a rate of three cycles per second, the oscillator 104 will produce 60 pulses for each rotation of the downhole transducer. Thus, the electron beam will be controlled for the production of a spot on the screen at a rate of 60 times for each sawtooth wave beam sweep from the generator 56. Since the output from circuit 100 varies the rate at which the beam is swept, it will vary the rate at which the spot is moved along the path to different positions on the screen as a function of the time or distance between the downhole transducer and the wall of the borehole. For each downhole rotation of the transducer there will thus be produced on the screen a trace pattern when photographed comprising 60 bright spots. The spots will be crowded together or spread apart depending upon a changing echo time or distance between the transducer and the borehole wall. If the echo time or distance increases, the spots will be spread apart since the voltage from circuit 100 will be increasing and the beam will be swept faster and over a greater distance before it is intensified by the oscillator output to form a spot. On the other hand, if the echo time or distance is decreasing, the spots will be crowded together since the voltage from circuit 100 will be decreasing and the rate of sweep will be less as the beam is periodically intensified by the output of oscillator 104.

As the borehole tool is moved through the borehole, the electron beam is stepped horizontally (in the embodiment of FIG. 1) whereby the trace patterns are moved horizontally across the screen of the scope. These trace patterns are photographed or recorded in side-by-side relationship by a camera 105 for the production of a two-dimensional print or display which gives information about the three-dimensional configuration of the borehole wall. The spots of the recorded trace patterns produced at the same time intervals relative to the beginning of the trace patterns form traces across the display having excursions representative of variations in the shape or configuration of the borehole wall.

FIG. 3 illustrates such a display. Assume that the electron beam is swept vertically from the bottom to the top for each sawtooth wave beam sweep. The rate of travel of the beam during each sweep is varied by the varying analog signal from circuit 100 combined with the sawtooth wave beam sweep. In this example, the beam is intensified five times during each sweep at equally spaced time intervals to form five spots on the screen during each beam sweep. The spots are shown in darkened form in FIG. 3. The distance between the spots will vary depending upon the rate of travel of the beam as it is periodically intensified. The beam is slowly swept or stepped horizontally from left to right whereby each vertical sweep is displaced to the left from the subsequent sweep. Ten sweeps $S_1 - S_{10}$ and hence ten vertical trace patterns are illustrated. The spots of the trace patterns produced at the same time intervals relative to the beginning of the trace patterns form five traces $T_1 - T_5$ across the display. The excursions of these five traces are representative of variations in the shape or configuration of the borehole wall.

In the above example wherein the beam is intensified periodically 60 times per sweep, the display will comprise 60 traces, the excursions of each trace representing variations in the shape or configuration of the borehole wall at the corresponding position in the borehole where the transducer is operated to transmit and receive as it is rotated. The display thus may be thought of as a multiarm caliper log since the plurality of traces represent caliper information obtained at a plurality of positions around the borehole wall as the transducer is rotated.

Figures 4, 6:
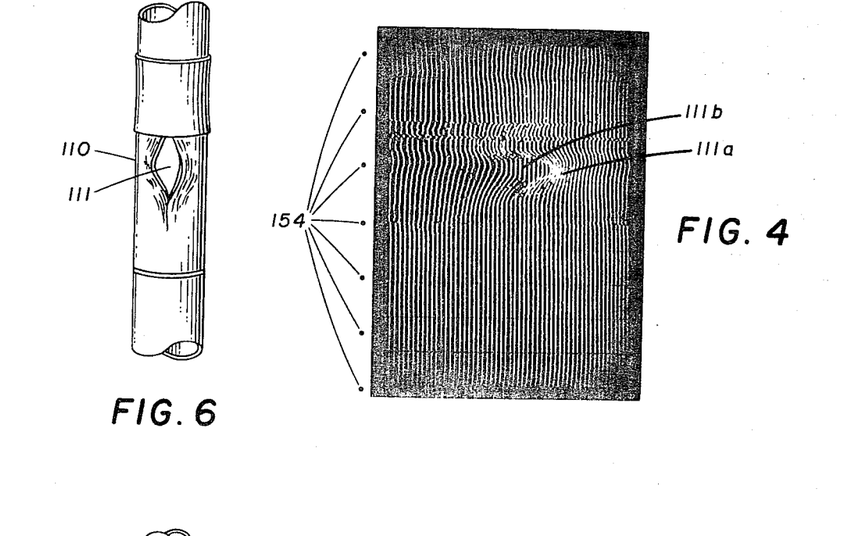
FIGS. 4 and 5 are displays taken of the inside of the pipes of FIGS. 6 and 7.
Figure 5:
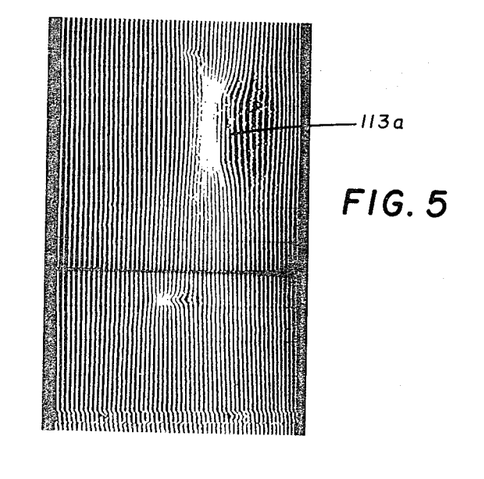
Figure 7:
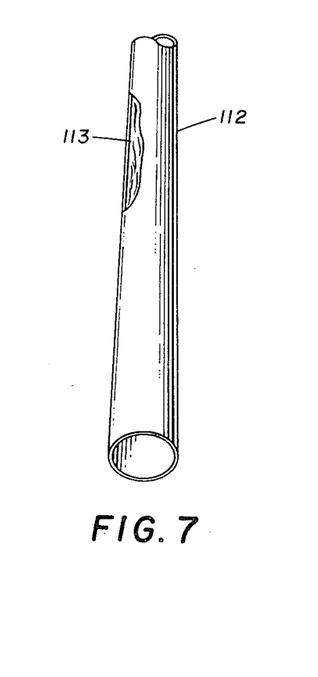

FIGS. 4 and 5 represent such displays obtained by operating the tool in the casing or pipes illustrated in FIG. 6 and 7, respectively. The pipe 110, shown in FIG. 6, was pressurized internally whereby a blowout or hole was formed through its wall at 111. The pipe 112, shown in FIG. 7, was partially collapsed at 113. In obtaining the displays of FIGS. 4 and 5, the tool was inserted into each of the pipes and moved through the pipes as the system was operating. A Polaroid camera was employed to record the trace patterns formed on the screen 103 of the scope 102. The electron beam of the scope was swept vertically as the transducer was rotated, and each trace pattern was stepped or displaced horizontally as the tool was moved through the pipes. The amount of horizontal displacement of each trace pattern was small whereby the corresponding dots of adjacent trace patterns merged to form continuous traces across the trace patterns. The prints of FIGS. 4 and 5 have been rotated 90° from the position that the traces or displays appeared on the screen of the scope. Thus, in the prints of FIGS. 4 and 5, the ordinate represents pipe length and the abscissa represents the distance 360° around the inside of the pipe.

The traces of FIGS. 4 and 5 give information as to the direction in which a wall deviates and, in addition, the amount of deviation. When the cross section increases in size from an average diameter, the traces become spread apart and are deflected toward the right. Conversely, when the cross section decreases in size from an average diameter, the traces become crowded together and are deflected toward the left. The amount of deviation is a measure of the amount of deviation of the wall being probed.

Referring specifically to FIG. 4, it can be seen that the traces formed at 111a are deflected or displaced toward the right as the transducer was rotated to scan the aperture 111. The amount of displacement is substantial, indicating a large increase in pipe cross section at this point. A reflector was placed on the outside of the pipe 110 around the aperture 111 when measurements were made whereby the corresponding position, at 111b on the display, is not completely dark but has vertical traces extending therethrough.

Referring to FIG. 5, the traces at 113a are displaced toward the left, indicating a collapse in the pipe at this corresponding position. The amount of displacement is not great, indicating that the amount of wall collapse was not great.

Figure 8:
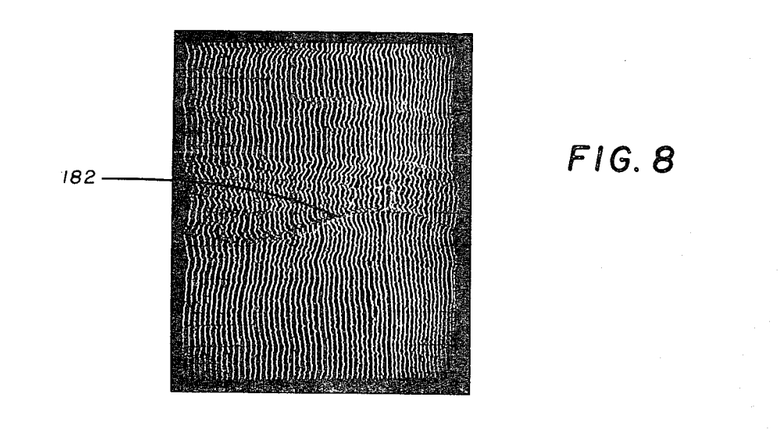
FIG. 8 is a display taken of the inside of a test borehole.

FIG. 8 is a display of caliper traces obtained by operating the tool 22 in an open-hole test borehole. These traces clearly display deviations and changes in the shape of the borehole wall.

The traces of FIGS. 4, 5, and 8 thus form a quantitative log since the wall deviation can be followed and exact measurements made as to the extent of deviation. Moreover, the system for obtaining the traces of FIGS. 4, 5, and 8 requires a minimum amount of operator "touch." This is due to the fact that the intensity of the electron beam does not require critical manual adjustment since the beam is merely ON or OFF.

Although it was stated previously that 60 traces may be produced, it is to be noted that the displays of FIGS. 4, 5, and 8 contain less than 60 traces, indicating that the oscillator 104 was producing pulses at a frequency of less than 180 pulses per second.

Figure 9:
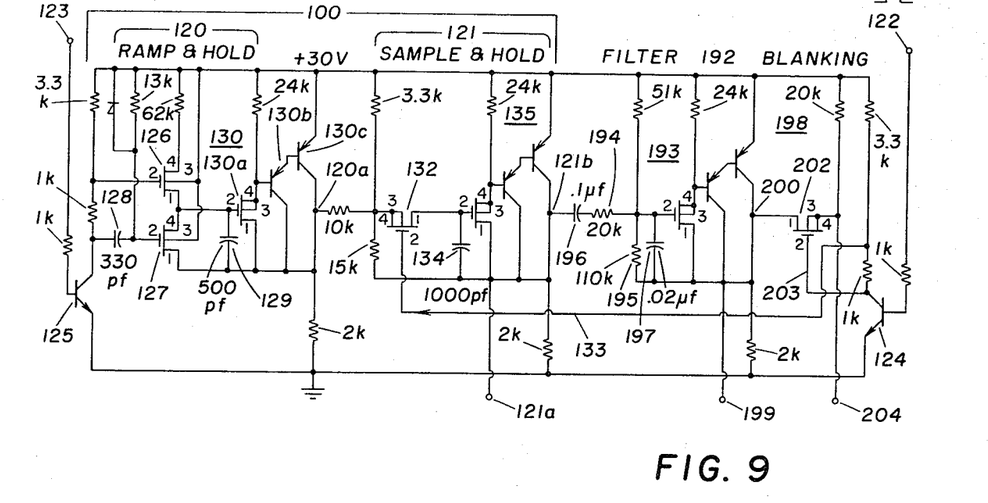
FIGS. 9 and 11 are detailed drawings of the circuitry of the present invention.
Figure 10:
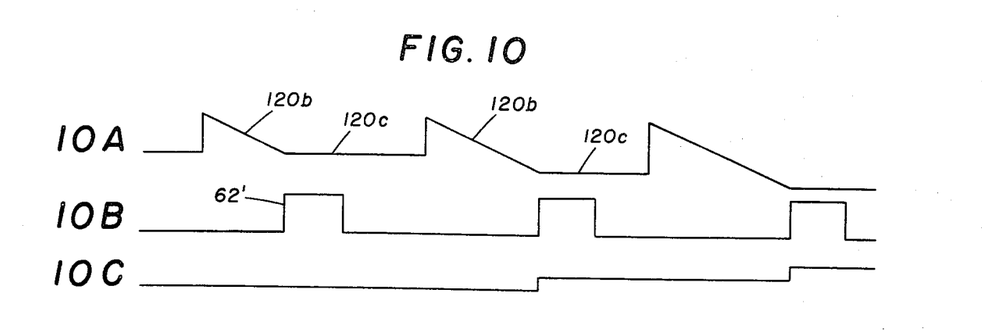

Referring to FIGS. 9 and 10, there will be described the system 100 for producing the analog voltage representative of two-way travel time or distance between the transducer and the borehole wall. The system comprises a ramp and hold circuit 120 and a sample and hold circuit 121. The pulses 62' of the same width and height are applied to an input 122, while the pulses 63', whose widths vary as a function of time or distance between the transducer and the borehole wall, are applied to an input 123. For the duration of each pulse 63', a ramp function is produced at the output 120a of circuit 120 which decreases to a level dependent upon a width of the pulse 63'. This level then is held until a subsequent pulse 63' is applied and another ramp function generated. FIG. 10A illustrates the output at point 120a. The ramp functions are illustrated at 120b and the levels to which the ramps decrease are illustrated at 120c. This output is applied to the sample and hold circuit 121. As indicated previously, the constant-width, constant-height pulses 62' occur immediately following a pulse 63'. These pulses are applied to the sample and hold circuit 121 to sample the voltage levels 120c immediately following the ramp function generated and to hold these levels until the next pulse 62'. FIG. 10B illustrates the time relationship of the pulses 62' relative to the ramp functions. FIG. 10C illustrates the output of the sample and hold circuit at 121a and 121b.

The downhole transducer is operated to transmit and receive at least 600 times per rotational cycle. Thus, an analog voltage is produced at the outputs 121a and 121b which varies in amplitude dependent upon the time or distance between the transducer and the borehole wall.

Referring again to FIG. 9, the circuitry shown comprises two input transistors 124 and 125 which are normally open or nonconducting. They are closed or rendered conducting by application of pulses 62' and 63' to the inputs 122 and 123, respectively. The ramp and hold circuit 120 comprises two FET switches 126 and 127 which normally are open or nonconducting. Also included are capacitors 128 and 129 which normally are discharged and charged respectively. Coupled to switches 126 and 127 is an inverting amplifier 130 which comprises FET transistor 130a, transistor 130b, and transistor 130c. When transistor 125 is turned ON by pulse 63', switch 126 is closed or turned ON for the duration of the pulse 63' while switch 127 is closed or turned ON only momentarily. When transistor 125 is ON, capacitor 128 becomes charged momentarily and capacitor 129 is discharged momentarily. Capacitor 128 quickly discharges and opens switch 127. Capacitor 129 charges through switch 126 until it opens when pulse 63' terminates. When capacitor 129 is discharged, the voltage at the output 120a increases to a reference level of about twenty volts and then decreases as capacitor 129 charges. This output, illustrated in FIG. 10A, is applied to FET switch 132 which normally is open. When pulse 62' closes transistor 124, an output is applied by way of conductor 133 to close FET switch 132. When switch 132 is closed, capacitor 134 charges to the voltage level 120c (FIG. 10A) following the ramp 120b. This potential is amplified by inverting amplifier 135 which is similar to amplifier 130. The output of this amplifier at points 121a and 121b thus is that illustrated in FIG. 10C.

Figure 11:
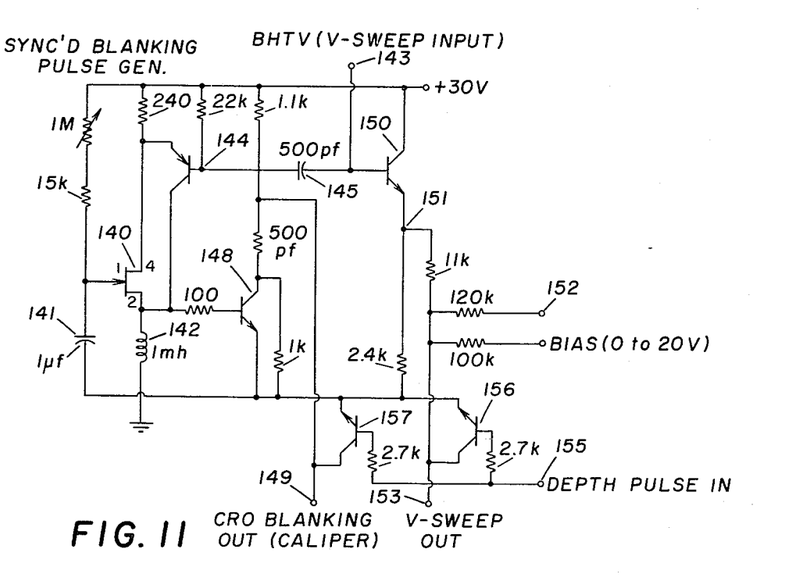

Referring to FIG. 11, the oscillator 104 is a free-running, unijunction oscillator comprising a unijunction transistor 140, capacitor 141, and inductor 142. This oscillator may be adjusted to produce 180 pulses per second as indicated above. These pulses are synchronized with the beginning of each sawtooth waveform from sawtooth generator 56 (FIG. 1). The output from generator 56 is applied to input terminal 143. When the sawtooth waveform reaches its peak and returns to its zero level, a negative pulse is applied to the base of transistor 144 through capacitor 145. This causes the output of the transistor 144 to be low, which fires the unijunction oscillator when the sawtooth waveform falls rapidly to its zero level. Thus, the oscillator is synchronized with each sawtooth waveform produced from generator 56.

The output of the unijunction oscillator is inverted by transistor 148 for the production of negative pulses at terminal 149 which are applied to the cathode of the oscilloscope to turn the beam ON to a level sufficient to form a spot on the screen of the scope.

The sawtooth waveform from terminal 143 also is applied by way of emitter follower 150 and mixed at junction 151 with the output of the sample and hold circuit. This output is applied from terminal 121a (FIG. 9) to terminal 152 for mixing with the sawtooth waveform at junction 151. The analog voltage mixed with the sawtooth waveform then is applied by way of terminal 153 to the vertical deflection plates of the oscilloscope 102.

Circuitry also is provided for periodically forming a depth mark or spot on the screen of the scope at periodic depth intervals as the tool is moved through the borehole. These marks or spots are photographed by the camera with the trace patterns and are displayed with the caliper traces produced to aid in interpretation. In FIG. 4, the spots 154 illustrate depth marks produced on the screen and photographed. They are illustrated in FIG. 4 as darkened spots for easier viewing.

In one embodiment, a depth pulse is produced for every 5 feet of movement of the tool through the borehole. Each pulse causes the electron beam to be swept momentarily to a zero position ahead of the trace patterns and intensified at the zero position to form the depth spot or mark in the scope. Referring again to FIG. 11, the depth pulses are applied to terminal 155. Each pulse momentarily causes transistors 156 and 157 to conduct. These transistors normally are open or non-conducting. When transistor 156 conducts, the output at terminal 153 momentarily falls to a low level which momentarily sweeps the beam to the zero position. In addition, when transistor 157 is rendered conducting, the voltage at terminal 149 falls to a low level whereby the electron beam is intensified when it is swept to its zero position.

Figure 12:
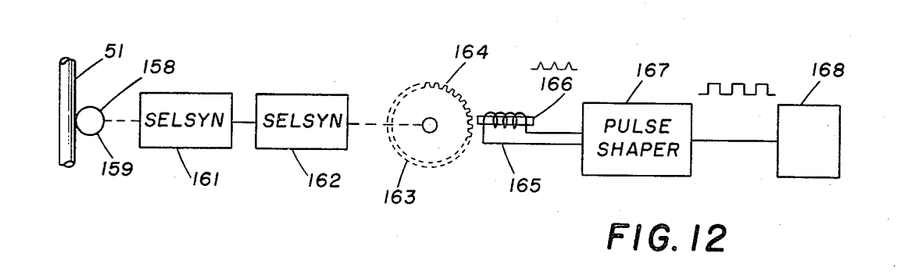
FIG. 12 illustrates one system for obtaining depth pulses for application to the circuitry of FIG. 11.

Referring to FIG. 12, there is disclosed one system for producing the depth pulses. This system comprises an arrangement for converting mechanical rotation of the sheave 158 to pulses representative of the tool depth. The sheave 158 is driven by the cable 51 as the tool is moved through the borehole. Coupling member 159 is driven by the sheave 158 and in turn drives a transmitting Selsyn 161. Selsyn 161 controls a Selsyn 162. Selsyn 162 drives a gear 163 which has 200 teeth 164 formed on its outer periphery. A detecting device, comprising an electrical coil 165 and a magnetic core 166, detects the teeth upon rotation of the gear 163. As each tooth passes the coil 165 and core 166, an electrical pulse is produced which is shaped by circuitry illustrated at 167. In one embodiment, 200 pulses are produced for each foot of travel of the tool. The output of pulse shaper 167 is applied to a counter 168 which produces a pulse after 1,000 pulses have been counted. The output of counter 168 is the depth pulses which are applied to the terminal 155 of FIG. 11.

Referring again to FIG. 1, the system disclosed is an on-line system for producing the desired records or prints in the field while logging. The system shown for stepping the electron beam horizontally comprises a potentiometer 170 having an arm 171 which is mechanically coupled through gear reducer 172 to the sheave 158. As the cable 51 is moved while logging, the arm 171 of the potentiometer 170 moves across the resistive element 173, thereby generating a slowly changing voltage which is applied to the horizontal deflection plates of the scope 102 to step the electron beam horizontally for each rotation of the downhole transducer.

Figure 13:
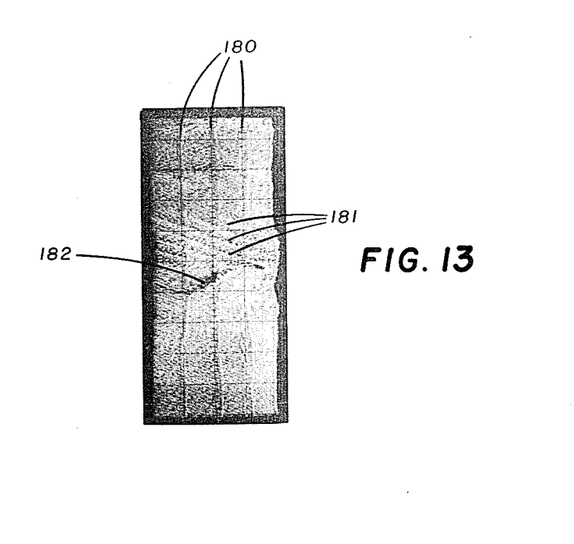
FIGS. 13, 14, and 15 are displays obtained with different embodiments of the present invention.

Now that one embodiment of the present invention has been described in detail, other embodiments will be disclosed. Instead of turning the beam ON periodically with the output of the oscillator 104, the beam may be turned ON continuously to obtain a three-dimensional presentation of the wall of the borehole. Such a presentation is illustrated in FIG. 13. This presentation may be obtained by opening switch 104a of FIG. 1 and adjusting the beam control dial 102a to increase the intensity of the electron beam to a level whereby a spot is continuously formed on the screen of the oscilloscope as the electron beam was swept by the combined output of generator 56 and the analog voltage system 100. A three-dimensional effect or display is obtained having variations in tones which are representative of variations in the time or distance between the transducer and the borehole wall. These tone variations are formed since the beam is swept along its path at different rates dependent upon a changing echo time or distance between the transducer and the borehole wall. For example, the more the distance increases, the faster the beam will be swept. The beam will be recorded by the print obtained with the camera as a lightened section of the trace pattern on the screen of the oscilloscope.

The display of FIG. 13 was obtained of the same section of the test borehole as was the display of FIG. 8. In FIG. 13 the vertical-like columns 180 are believed due to centralizers of previous tools employed to log the test borehole. The oblique marks 181 are believed to be formed by the drill bit while drilling operations were carried out. The S-shaped configuration at 182 is due to a fracture formed in the subsurface formations. This same fracture is identified also at 182 in FIG. 8. It is to be noted that the display of FIG. 13 not only has tone variations which reflect information about distance but also the left and right edges have deviations which give information about time or distance between the transducer and the borehole wall.

As a further alternative the beam may be turned ON continuously while the output of the oscillator 104 is coupled to the Z-axis of the scope 102 as in FIGS. 1 and 11 to periodically intensify the electron beam whereby a combination of the display of FIGS. 13 and 8 may be obtained. In such a combination display, the caliper traces of FIG. 8 would extend vertically down the display of FIG. 13, thereby allowing one to better interpret the display of FIG. 13.

Figure 14:
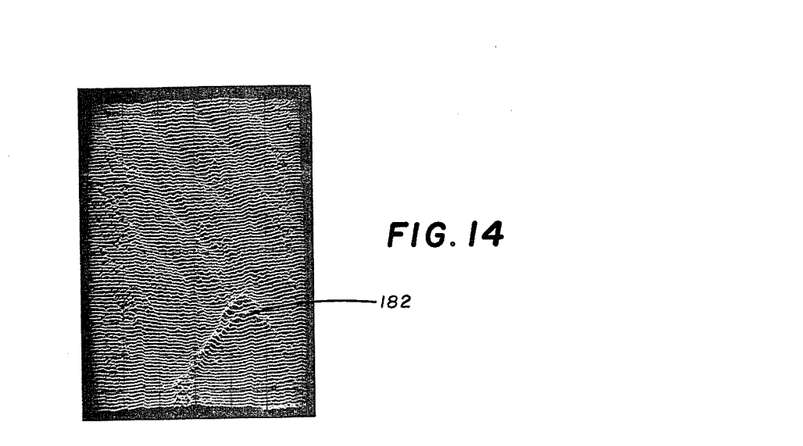

In another embodiment, the intensity control 102a may be adjusted whereby the intensity of the electron beam is sufficient to continuously produce a spot on the screen of the scope. The sawtooth wave output from sweep generator 56 may be applied to vertical deflection plates and the analog voltage from circuit 100 applied to the horizontal deflection plates. The electron beam will be swept vertically and deflected in the horizontal direction as a function of the time or distance between the transducer and the borehole wall. A stepping voltage may be obtained from the potentiometer 170 and applied to the horizontal deflection plates to displace the traces horizontally. The bias of this voltage may be sufficient to completely separate each trace formed. The resulting traces may then be photographed. FIG. 14 is a print obtained in this manner. It has been rotated 90° whereby the ordinate represents borehole depth and the abscissa represents distance around the inside of the borehole. The display of FIG. 14 represents a portion of the same section of the test borehole illustrated by FIGS. 8 and 13. In FIG. 14, the fracture is identified at 182. Each trace of FIG. 14 has excursions dependent upon the deviation of the borehole around the borehole wall at a given depth. Each trace of FIG. 8 has excursions dependent upon the deviation of the borehole wall in a given azimuth direction at a plurality of depths.

Figure 15:
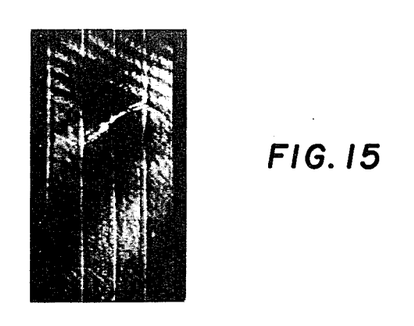

In a further embodiment, a display of the three-dimensional configuration of the borehole wall may be obtained by sampling the amplitude of the analog signal from system 100 with the reflection pulses and applying the sampled analog signal to intensify the electron beam to levels dependent upon the time or distance between the transducer and the borehole wall. In this embodiment, the electron beam is swept vertically by the sawtooth waveform from generator 56 and stepped horizontally by the stepping voltage obtained, for example, from the potentiometer 170 of FIG. 1. The trace patterns produced on the screen of the scope also are photographed by camera 105 for the production of a display having tones representative of the time or distance between the transducer and the borehole wall. If the tool 22 becomes decentralized, the resulting display will have darkened areas or background over about half of its area. The effect of decentralization is readily apparent by the display of FIG. 15. This is a display of the same section of the borehole as represented by FIGS. 8, 13, and 14.

Figure 16:
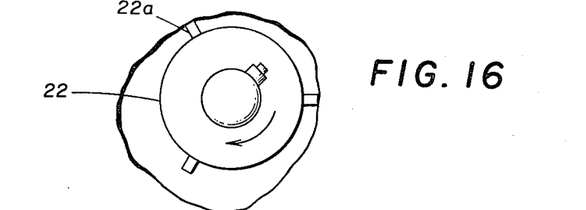
FIG. 16 illustrates the borehole tool decentralized in a borehole.
Figure 17:
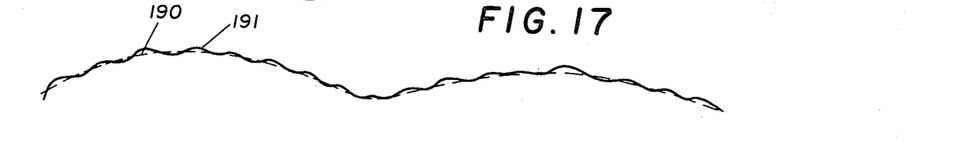
FIG. 17 is a trace which illustrates the effect of decentralization on an analog voltage representative of the time or distance between the transducer and the borehole wall.

Decentralization can occur when the borehole enlarges to a size whereby the centralizers 22a become ineffective. Thus, as the transducer 23 is rotated, the analog voltage produced by system 100 will comprise high frequency variations riding on top of a slowly changing background. For example, if the tool becomes decentralized as illustrated in FIG. 16, the output of circuitry 100 upon two rotational cycles of the transducer 23 may appear as illustrated in FIG. 17. The slower changing general shape of the voltage, illustrated by the dotted curve 190, is due to the decentralization of the tool and hence of the transducer in the borehole. The smaller and more rapid changes in amplitude, illustrated at 191, are due to small changes in borehole configuration, for example, due to fractures.

Figure 18:
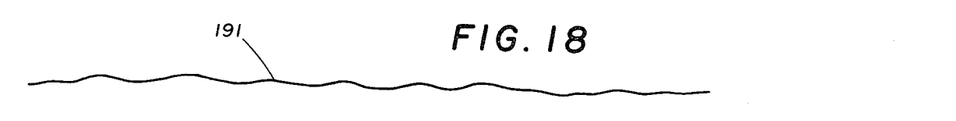
FIG. 18 illustrates the trace of FIG. 17 with decentralization effects removed.

In accordance with another aspect of the present invention, the output of circuit 100 is applied to a filter which removes the slower changing waveform and passes the more rapid amplitude changes which are due to the smaller variations in borehole configuration. The output of circuit 100 after it is filtered by a suitable filter may be that as illustrated in FIG. 18.

Figure 19:
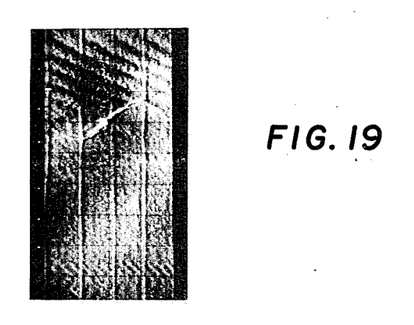
FIG. 19 is a display obtained with one embodiment of the present invention with the effects of decentralization removed.

Referring again to FIG. 9, the filter is identified at 192. It comprises a differentiating circuit 193 coupled to the output of the sample and hold circuit 121. Circuit 193 is formed by resistors 194 and 195 and capacitors 196 and 197. It will remove the d-c or lower frequency components from the output of circuit 121 whereby the output of the differentiating circuit will reflect the change in distance or time between the transducer and the borehole wall. This output is inverted by amplifier 198 (which is similar to amplifiers 130 and 135) and applied to a sampling circuit comprising FET 202 which normally is OFF. The shaped reflection pulses 62', when they occur, close the switch 124 which produces an output which is applied by way of conductor 203 to close the switch 202. When this occurs, negative-going pulses are produced at terminals 204 having amplitudes which are a function of or dependent upon the change in distance or time between the transducer and the borehole wall. The output of terminal 204 may be applied to the Z-axis to intensify the electron beam with the sampled pulses obtained from the filtered analog voltage from circuit 100. As indicated above, in this embodiment, the electron beam is swept vertically by the sawtooth waveform produced by generator 56, and the resulting trace patterns are moved horizontally by the stepping voltage, for example, from potentiometer 170. The resulting display when photographed is illustrated in FIG. 19. As can be seen, the darkened background of FIG. 15, due to decentralization of the tool, has been reduced. It is to be noted that both of the displays of FIGS. 15 and 19 were obtained with the use of the filter 192. However, in obtaining the display of FIG. 15, the filter was adjusted to allow passage of more low frequencies compared to the highs.

Instead of stepping each trace pattern on the display medium of the oscilloscope and photographing the trace patterns in side-by-side relationship with a film which is held stationary, the presentations could be obtained by producing each trace pattern for each scanning cycle at the same position on the screen of the oscilloscope and photographing successive trace patterns with a camera whose film is driven continuously with respect to the screen of the oscilloscope in accordance with movement of the subsurface tool. Such a system is disclosed in the aforementioned U.S. Pat. No. 3,369,626.

As mentioned previously, the present tool was disclosed as being useful in logging cased or uncased boreholes. It is understood that the tool could be employed to investigate pipelines to determine whether leaks have developed and their location.

The system of FIG. 1 is an on-line system for obtaining the desired presentations in the field while logging. It is understood that the borehole data may be recorded on magnetic tape and subsequently played back in data processing centers to obtain the desired presentations. A system for recording the borehole data for playback purposes is described and claimed in United States patent application Ser. No. 855,180, filed Sept. 4, 1969, by Joseph Zemanek, Jr., now abandoned. In that system, the sync pulses and reflection signals are recorded on one track of a magnetic tape. The cyclic orienting or rotating switch signals are recorded on another track of the tape. In addition, the system similar to that of FIG. 12 is employed to convert mechanical rotation of the sheave 158 to depth pulses which are recorded on a third track of the tape. During playback, the sync and receiver signals and the cyclic orienting or rotating switch signals are detected and applied to circuitry for obtaining the desired presentation on the oscilloscope. On playback, the depth pulses are converted to an analog voltage by a digit-to-analog converter. This voltage drives a stepping motor which in turn drives a Selsyn to move the arm of a potentiometer to produce a stepping voltage for stepping the trace patterns on the screen of the oscilloscope. The displays of FIGS. 4, 5, 8, 13, 14, 15, and 19 were produced from casing and borehole data recorded on magnetic tape and replayed with a system similar to that described in the above mentioned U.S. patent application Ser. No. 855,180. In obtaining these displays, however, an internal sweep obtained from the scope was employed to sweep the beam horizontally to displace each trace on the screen of the scope.

Figure 20:
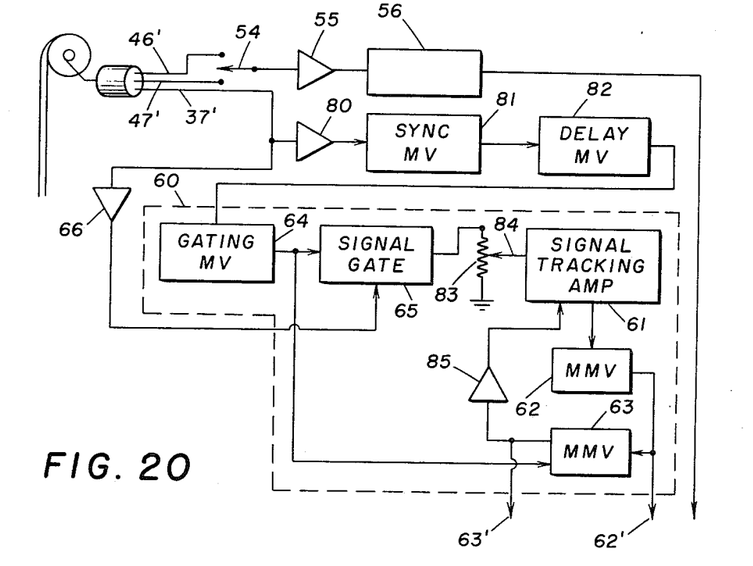
FIG. 20 illustrates in block diagram a system for obtaining pulses used for actuating the various systems and circuits for obtaining the displays of interest.

Referring now to FIG. 20, there will be described briefly the system 60 for producing the pulses 62' and 63'. This arrangement comprises a signal-tracking amplifier or control circuitry 61, a monostable multivibrator 62, and a feedback monostable multivibrator 63 employed in combination with gating multivibrator 64 and a signal gate 65. Normally, gate 65 is OFF and is opened only at a time when the reflection signals are expected to occur to allow their passage. Sync pulses 73b are employed to open the gate 65 at the desired time. These sync pulses, amplified by amplifier 80, trigger sync monostable multivibrator 81 for the production of output pulses illustrated at 81' in FIG. 2C. A delay multivibrator 82, whose output is illustrated at 82' in FIG. 2D, is triggered coincidentally by the output from multivibrator 81. The output of multivibrator 82 is differentiated and a spike obtained from the trailing edge of signal 82' is employed to trigger monostable multivibrator 64 for the production of a gating signal. This gating signal is illustrated at 64' in FIG. 2E and occurs when the signals representative of reflected energy are expected to occur. Signal 64' opens the gate 65 to allow the reflected signals, inverted by amplifier 66 as illustrated at 71b' and 72b' in FIG. 2F, to pass to potentiometer 83. Potentiometer arm 84 is adjusted to control the level of signals passed to signal-tracking amplifier 61. This amplifier normally produces a zero level output and requires two inputs of low level or negative polarity applied thereto simultaneously before it will produce a positive output. The inputs to amplifier 61 are applied from arm 84 and from inverter 85 coupled from multivibrator 63. The positive output produced by amplifier 61 with the arrangement shown is a pulse, illustrated at 61' in FIG. 2G, of short duration and having a fast rise and fall time. The beginning of this pulse substantially coincides with the beginning of a primary reflection 71a and is employed to trigger monostable multivibrator 62 for the production of the square-wave signal 62' which begins at a time substantially coinciding with the beginning of pulse 61'. Each square-wave signal 62' produced by multivibrator 61 has the same width and amplitude.

Only one signal 62' is produced during each period of operation of the transducer since signal 62' is applied to feedback multivibrator 63 to terminate the positive output from amplifier 61 shortly after its beginning, thereby causing the fast fall time of signal 61'.

Referring to FIG. 2J, the output of multivibrator 63 normally is at a low or zero level. The output of gating multivibrator 64 is applied to trigger multivibrator 63 for the production of a square-wave signal 63' which begins at a time coinciding with the beginning of the output pulse 64' produced by gating multivibrator 64. This signal 63' is inverted by inverter 85 for the production of a negative signal 85' illustrated in FIG. 2K. Signal 85' is applied to one of the two inputs of amplifier 61, allowing the passage of negative polarity signal pulses applied to the other input. The square-wave signal 62' is fed back to multivibrator 63. The beginning of the square-wave signal 62' terminates signal 63' and hence signal 85', thereby blocking the passage of pulses through amplifier 61 immediately following the beginning of a primary signal 71b. Amplifier 61 cannot pass any more signals from gate 65 during this same period since gating multivibrator 64 will not be triggered until the next period.

What is claimed is:

1. A method of presenting data on a display medium, said data being obtained from cyclic scanning operations carried out, with scanning means, angularly around the wall of an aperture at a plurality of points and at each of a plurality of different positions along the direction of the axis of the aperture to obtain information about the configuration of the wall of the aperture, comprising the steps of:

moving a visible spot to different positions along a predetermined path on said display medium once for each aperture scanning cycle, varying the rate at which said spot is moved to said positions along said path as a function of the distance between the scanning means and the wall of the aperture at each scanning point to produce a trace pattern of interest on said display medium for each aperture scanning cycle, and recording a plurality of said trace patterns in side-by-side relationship to form a display of the configuration of the wall of the aperture.

2. A method of presenting data on a display medium, said data being obtained from cyclic scanning operations carried out, with scanning means, angularly around the wall of an aperture at a plurality of points and at each of a plurality of different positions along the direction of the axis of the aperture to obtain information about the configuration of the wall of the aperture, comprising the steps of:

moving a visible spot to different positions along a predetermined path on said display medium once for each aperture scanning cycle, varying the rate at which said spot is moved to said positions along said path as a function of the distance between the scanning means and the wall of the aperture at each scanning point to produce a trace pattern of interest on said display medium for each aperture scanning cycle, and continuously displaying said spot as it is moved along said path to produce a continuous trace pattern on said display medium for each borehole scanning cycle.

3. The method of claim 2 comprising the step of:

periodically intensifying said spot at equally spaced time intervals along said path.

4. The method of claim 3 comprising the step of:

recording a plurality of said trace patterns in side-by-side relationship whereby intensified spots at the same time intervals across said trace patterns form traces having excursions indicative of variations of the size of the aperture at different positions along the direction of the axis of the aperture.

5. The method of claim 2 comprising the step of:
recording a plurality of said trace patterns in side-by-side relationship to form a display of the configuration of the wall of the aperture.

6. A method of presenting data on a display medium, said data being obtained from cyclic scanning operations carried out, with scanning means, angularly around the wall of an aperture at a plurality of points and at each of a plurality of different positions along the direction of the axis of the aperture to obtain information about the configuration of the wall of the aperture, comprising the steps of:
moving a visible spot to different positions along a predetermined path on said display medium once for each aperture scanning cycle,
varying the rate at which said spot is moved to said positions along said path as a function of the distance between the scanning means and the wall of the aperture at each scanning point to produce a trace pattern of interest on said display medium for each aperture scanning cycle, and
periodically displaying said spot only at equally spaced time intervals along said path.

7. The method of claim 6 comprising the step of:
recording a plurality of said trace patterns in side-by-side relationship whereby spots at the same time intervals across said trace patterns form traces having excursions indicative of variations of the size of the aperture at different positions along the direction of the axis of the aperture.

8. A method of presenting borehole data on a display medium of a display system having an electron beam producing means and two deflection means for producing electron beam deflection fields, said data being obtained by rotating a scanning means in a borehole to cyclically scan the wall of the borehole at a plurality of different depths to obtain information about the configuration of the wall of the borehole, comprising the steps of:
producing a sawtooth wave beam sweep once for each borehole scanning cycle,
controlling said beam producing means to produce an electron beam at least at a plurality of equally spaced time intervals during each beam sweep to form a spot on said display medium at least at said plurality of equally spaced time intervals,
applying said sawtooth wave beam sweep to one of said deflection means for moving said spot across said display medium during each beam sweep,
producing an output which is a function of the distance between the scanning means and the wall of the borehole as the scanning means is rotated, and
applying said output to vary the deflection field of one of said deflection means to produce a trace pattern with said spot which reflects information about the configuration of the wall of the borehole.

9. A method of presenting borehole data on a display medium of a display system having an electron beam producing means and an electron beam deflection means, said data being produced by rotating a scanning means in a borehole to cyclically scan the wall of the borehole at a plurality of different depths to obtain information about the configuration of the wall of the borehole, comprising the steps of:
producing a beam sweep once for each borehole scanning cycle,
controlling said electron beam producing means to produce an electron beam to form a spot on said display medium,
applying said beam sweep to said deflection means for moving said spot to different positions along a predetermined path once for each borehole scanning cycle,
producing an output which is a function of the distance between the scanning means and the wall of the borehole as the scanning means is rotated, and
combining said output with said beam sweep to vary the rate of travel of said spot along said path as a function of the distance between the scanning means and the wall of the borehole as the scanning means is rotated.

10. A method of presenting borehole data on a display medium of a display system having an electron beam producing means and two deflection means for producing electron beam deflection fields, said data being obtained from cyclic scanning operations carried out angularly around the wall of a borehole at a plurality of different depths wherein:
an energy transmitting and receiving means is rotated cyclically in a borehole and operated periodically during each cycle to transmit energy pulses to the borehole wall and to detect energy reflected from the borehole wall, and reflection signals are produced in response to reflected energy detected, said method comprising the steps of:
producing a sawtooth wave beam sweep once for each borehole scanning cycle,
controlling said electron beam producing means to produce an electron beam at least at a plurality of equally spaced time intervals during each beam sweep to form a spot on said display medium at least at said plurality of equally spaced time intervals,
applying said sawtooth wave beam sweep to one of said deflection means for moving said spot across said display medium during each beam sweep,
employing the reflection signals to produce an output which is a function of the distance between the transmitting and receiving means and the wall of the borehole as the transmitting and receiving means is rotated, and
applying said output to vary the deflection field of one of said deflection means to produce a trace pattern with said spot which reflects information about the configuration of the wall of the borehole.

11. The method of claim 10 comprising the step of:
applying said output and said sawtooth wave beam sweep to the same deflection means whereby said function varies the rate at which said spot is moved across said display medium.

12. The method of claim 11 comprising the step of:
controlling said electron beam producing means to form said spot on said display medium only at a plurality of equally spaced time intervals during each sawtooth wave beam sweep.

13. The method of claim 11 comprising the step of:
controlling said electron beam producing means to form said spot on said display medium continuously during each sawtooth beam wave sweep.

14. The method of claim 13 comprising the step of:
intensifying the electron beam to a higher level at a plurality of equally spaced time intervals during each sawtooth wave beam sweep.

15. The method of claim 11 comprising the steps of:
controlling said electron beam producing means to form said spot on said display medium continuously during each sawtooth wave beam sweep,
applying said sawtooth wave beam sweep to one of said deflection means for moving said spot across said display medium during each beam sweep, and
applying said output to the other of said deflection means for causing excursions of said spot to occur as it is moved across said display medium during each beam sweep.

16. A method of logging a borehole for data and for presenting said data on a display medium of a display system having an electron beam producing means and two deflection means for producing electron beam deflection fields, comprising the steps of:
cyclically rotating an energy transmitting and receiving means in said borehole at each of a plurality of different depths,
periodically operating said energy transmitting and receiving means during each cycle to transmit energy pulses to the borehole wall and to detect energy reflected from the borehole wall,
producing reflection signals in response to reflected energy detected,
producing a sawtooth wave beam sweep once for each borehole scanning cycle,
controlling said electron beam producing means to produce an electron beam at least at a plurality of equally spaced time intervals during each beam sweep to form a spot on said display medium at least at said plurality of equally spaced time intervals,
applying said sawtooth wave beam sweep to one of said deflection means for moving said spot across said display medium during each beam sweep,
employing the reflection signals to produce an output which is a function of the distance between the transmitting and receiving means and the wall of the borehole as the transmitting and receiving means is rotated, and
applying said output to vary the deflection field of one of said deflection means to produce a trace pattern with said spot which reflects information about the configuration of the wall of the borehole.

17. A system for recording borehole data obtained from cyclic scanning operations carried out angularly around the wall of a borehole at a plurality of different depths wherein:
an energy transmitting and receiving means is rotated cyclically in a borehole and operated periodically during each cycle to transmit energy pulses to the borehole wall and to detect energy reflected from the borehole wall, and reflection signals are produced in response to reflected energy detected, said system comprising:
a display system having a display medium, an electron beam producing means, and two deflection means for producing electron beam deflection fields,
means for producing a sawtooth wave beam sweep once for each borehole scanning cycle,
control means for controlling said electron beam producing means to produce an electron beam at least at a plurality of equally spaced time intervals during each beam sweep to form a spot on said display medium at least at said plurality of equally spaced time intervals,
means for applying said sawtooth wave beam sweep to one of said deflection means for moving said spot across said display medium during each beam sweep,
means for employing the reflection signals to produce an output which is a function of the distance between the transmitting and receiving means and the wall of the borehole as the transmitting and receiving means is rotated, and
means for applying said output to vary the deflection field of one of said deflection means to produce a trace pattern with said spot which reflects information about the configuration of the wall of the borehole.

18. The system of claim 17 comprising:
means for combining said output and said beam sweep for application to one of said deflection means,
said control means comprising:
means for periodically producing pulses at equally spaced time intervals during each beam sweep, and
means for synchronizing said pulses with the beginning of each beam sweep,
said synchronized pulses being applied to said electron beam producing means for forming said spot on said display medium only at said time intervals.

19. The system of claim 17 comprising:
means for combining said output and said beam sweep for application to one of said deflection means,
said control means comprising means for controlling said electron beam producing means to continuously produce an electron beam during each beam sweep to continuously form said spot on said display medium during each beam sweep.

20. The system of claim 19 comprising:
means for combining said output and said beam sweep for application to one of said deflection means,
said control means comprising:
means for periodically producing pulses at equally spaced time intervals during each beam sweep, and
means for synchronizing said pulses with the beginning of each beam sweep, said synchronized pulses being applied to said electron beam producing means for intensifying said spot on said display medium at said time intervals.

21. The system of claim 17 wherein said control means comprises:
means for controlling said electron beam producing means to continuously produce an electron beam during each beam sweep to continuously form said spot on said display medium during each beam sweep,
said beam sweep being applied to one of said deflection means, and
said output being applied to the other of said deflection means.

22. A method of presenting borehole data on a display medium of a display system having an electron beam producing means and two deflection means for producing electron beam deflection fields, said data being obtained from cyclic scanning operations carried out angularly around the wall of a borehole at a plurality of different depths wherein:
an energy transmitting and receiving means is rotated cyclically in a borehole and operated periodically during each cycle to transmit energy pulses to the borehole wall and to detect energy reflected from the borehole wall, and reflection signals are produced in response to reflected energy detected,
said method comprising the steps of:
producing a sawtooth wave beam sweep once for each borehole scanning cycle,
applying said sawtooth wave beam sweep to one of said deflection means for moving a spot, formed on said display medium by an electron beam, across said display medium during each beam sweep,
employing the reflection signals to produce a function having an amplitude representative of the distance between the transmitting and receiving means and the wall of the borehole as the transmitting and receiving means is rotated,
producing a resultant function by removing low frequency components from said function to remove slow changes in amplitude due to slow changes in the distance between the transmitting and receiving means and the wall of the borehole as sensed by the transmitting and receiving means as it is rotated, and
employing said resultant function to produce a trace pattern on said display medium for each beam sweep which reflects information about the configuration of the wall of the borehole.

23. The method of claim 22 comprising the step of:
filtering said function to remove said low frequency components to produce said resultant function.

24. The method of claim 23 comprising the steps of:
employing said reflection signals to sample said resultant function at times corresponding to the reception of reflected energy for the production of output pulses, and
applying said output pulses to said electron beam producing means to control the intensity of the electron beam produced.

* * * * *